United States Patent [19]

English et al.

[11] Patent Number: 5,264,666
[45] Date of Patent: Nov. 23, 1993

[54] CARGO HOOK WITH WEIGHING SCALE

[75] Inventors: David C. English, Seattle; David H. Fish, Redmond; Ronald A. Wenzel, Kirkland, all of Wash.

[73] Assignee: Measurement Systems International, Seattle, Wash.

[21] Appl. No.: 975,500

[22] Filed: Nov. 12, 1992

[51] Int. Cl.$^5$ ............................................. B66C 1/40
[52] U.S. Cl. ................................. 177/147; 177/139; 177/211; 177/261
[58] Field of Search ............... 177/147, 261, 211, 139, 177/DIG. 9

[56] References Cited

U.S. PATENT DOCUMENTS

| | | | |
|---|---|---|---|
| 3,081,833 | 3/1963 | Kester | 177/147 |
| 3,499,500 | 3/1970 | Harding | 177/136 |
| 3,854,540 | 12/1974 | Holmstrom, Jr. | 177/136 |
| 3,949,822 | 4/1976 | English et al. | 177/126 |
| 4,140,010 | 2/1979 | Kulpmann et al. | 177/147 X |
| 4,153,123 | 5/1979 | Bereyziat | 177/147 |
| 4,420,052 | 12/1983 | Hale | 177/132 |
| 4,482,783 | 11/1984 | Laimins | 177/147 |
| 4,619,337 | 10/1986 | Behrend et al. | 177/210 R |
| 4,780,838 | 10/1988 | Adelson | 364/567 |
| 4,899,600 | 2/1990 | Lee | 177/210 C X |
| 4,998,763 | 3/1991 | Henke | 294/82.33 |
| 5,033,563 | 7/1991 | Brainerd, Jr. et al. | 177/132 |

Primary Examiner—Benjamin R. Fuller
Assistant Examiner—Randy W. Gibson
Attorney, Agent, or Firm—Olson & Olson

[57] ABSTRACT

A cargo hook having fore and aft trunnions mounted in fore and aft bearings supported on frame members of a helicopter or the like, is provided with strain gauges secured in a bore in the aft trunnion for measuring shear strain on the trunnion by a load supported by the cargo hook. Additional strain gauges are secured in the aft trunnion bore for measuring axial and Poisson forces on the trunnion as the axis through the fore and aft trunnions varies from horizontal. The strain gauges are included in an electric circuit of a Wheatstone bridge and an indicator which converts the electric signals from the strain gauges to a readout of units of load weight. The strain gauges which measure axial and Poisson forces are connected in the electric circuit to compensate for the deviation from horizontal of the axis through the fore and aft trunnions, to provide an accurate readout of load weight applied to the cargo hook. A low RF impedence ring is mounted in the trunnion bore to protect against electromagnetic inteference, and a passageway in the trunnion for leading electrical conductors from the strain gauges outwardly of the trunnion, is filled with a sealant for protecting the strain gauges against environmental contaminants such as dust and moisture.

12 Claims, 4 Drawing Sheets

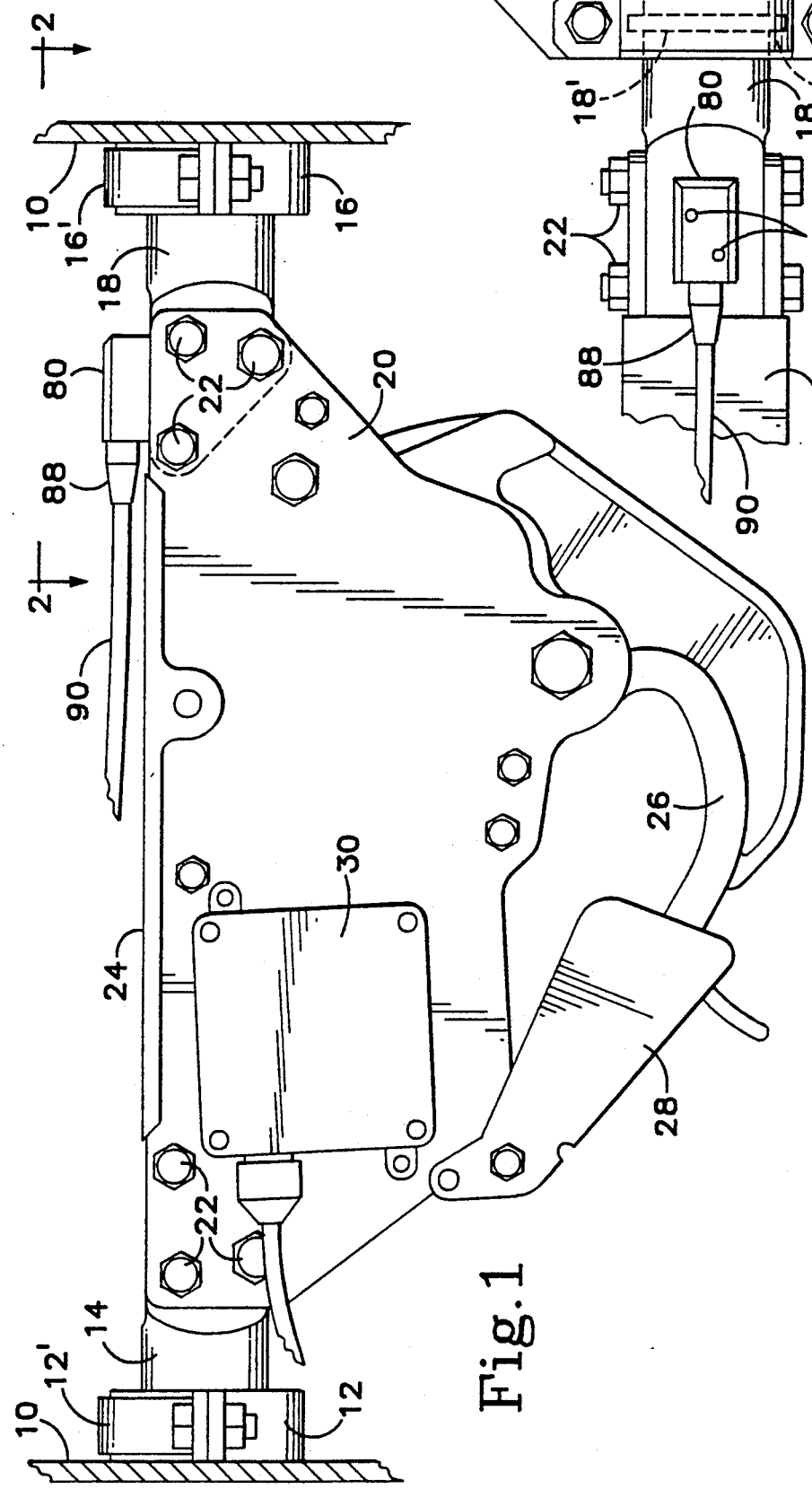

CARGO HOOK WITH WEIGHING SCALE

BACKGROUND OF THE INVENTION

This invention relates to cargo hooks for releasably transporting loads, and more particularly to a cargo hook mounted on a helicopter or the like and having integrated therewith a scale for weighing the load carried by the hook.

Certain types of helicopters, such as the Black Hawk of Sikorsky Aircraft, utilize a cargo hook which is incorporated in an elongated body having opposite end trunnions which are supported in fore and aft bearings mounted on the framework of the helicopter. The cargo hook and body assembly thus is allowed to swing about an axis that is parallel to the longitudinal axis of the helicopter. Because of the limitation of space and various functional considerations, this type of cargo hook does not allow employment of conventional load cell weighing systems.

SUMMARY OF THE INVENTION

In its basic concept, the cargo hook of the type that is supported by end trunnions journaled in spaced bearings, is provided with strain gauges arranged on one of the trunnions to measure shear strain imposed upon said trunnion by the weight of the load supported by the cargo hook. Additional strain gauges are arranged on said one trunnion to measure axial forces imposed on said trunnion by the weight of the load at various pitch angles of the helicopter.

The principal objective of this invention is to provide a weighing scale integrated with the cargo hook of a helicopter or the like in which the cargo hook is supported by fore and aft trunnions journaled in fore and aft spaced bearings.

Another objective of this invention is to provide a cargo hook and weighing scale assembly of the class described in which means is provided for compensating for pitch angle of the trunnion axis relative to horizontal.

Still another objective of this invention is the provision of a cargo hook and weighing scale assembly of the class described which incorporates means for providing both electromagnetic interference protection and environmental moisture protection which meet the stringent specifications of the aircraft industry.

Another objective of this invention is the provision of a cargo hook and weighing scale assembly of the class described in which the assembly of trunnion and strain sensing means is easily removed for service without further disassembly of the cargo hook.

A further objective of this invention is to provide a cargo hook and weighing scale assembly of the class described for a Sikorsky S-70 Black Hawk helicopter which involves minimal alternation of the existing cargo hook assembly.

A still further objective of this invention is the provision of a cargo hook and weighing scale assembly of the class described which is of simplified construction for economical manufacture, maintenance and repair.

The foregoing and other objects and advantages of this invention will appear from the following detailed description, taken in connection with the accompanying drawings of a preferred embodiment.

BRIEF DESCRIPTION OF THE DRAWINGS

FIG. 1 is a side elevation of a cargo hook having its fore and aft trunnions journaled in fore and aft bearings secured to frame components of a helicopter or the like.

FIG. 2 is a fragmentary top view as viewed in the direction of the arrows 2—2 in FIG. 1.

DESCRIPTION OF THE PREFERRED EMBODIMENT

Figure 3:
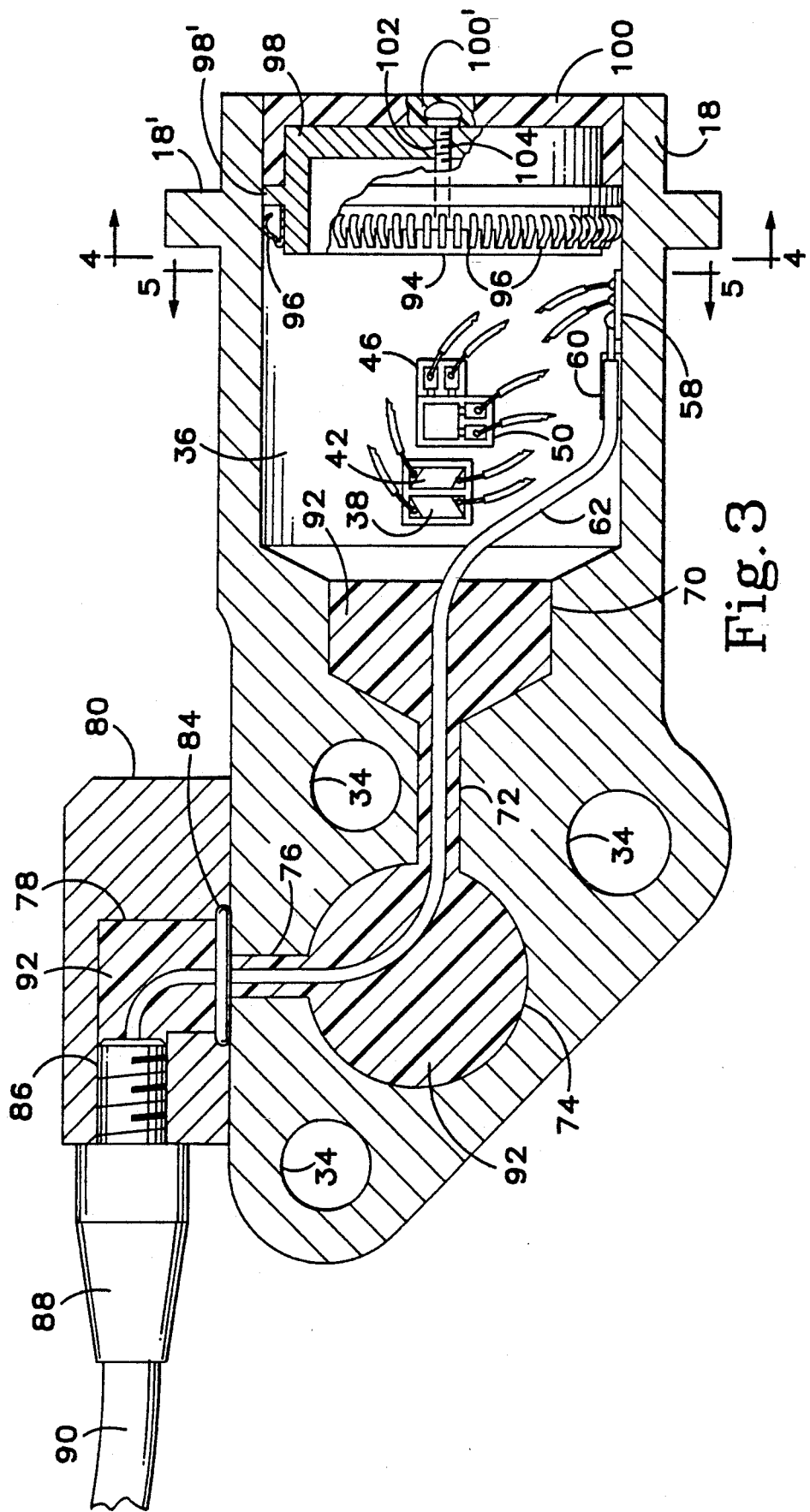
FIG. 3 is a side sectional view, on an enlarged scale, of the aft trunnion component of the cargo hook shown in FIG. 1.

Referring primarily to FIG. 1 of the drawings, there is shown a pair of longitudinally spaced frame members 10 of a helicopter fuselage or the like. In this regard, the frame members may form a part of any one of a variety of other load supporting structures, such as cranes.

Secured to the forward frame member 10 is a forward bearing base 12 configured to removably support therein a forward trunnion 14. A removable bearing cap 12' overlies the trunnion and retains the latter for rotation in the bearing assembly. In similar manner, a rearward bearing base 16 is secured to the aft frame member 10 and is configured, with its bearing cap 16', to removably support the aft trunnion 18. Like the forward trunnion, the aft trunnion is shown to be provided with a circumferential flange 18' which seats in an annular groove formed in the bearing base and bearing cap.

The fore and aft trunnions are secured to the opposite ends of cargo hook housing side plates 20 as by means of bolts 22. The cargo hook housing is provided with a top cover plate 24, and within the housing there is mounted the assembly of cargo hook arm 26 and latch 28. A control housing 30 on the outer side of the housing is connected electrically to actuator mechanism of the cargo hook arm and latch and is operable to effect release of a load supported from the cargo hook arm. The assembly of cargo hook housing, arm, latch and control mechanism is available commercially, and the illustration is of the cargo hook certified for use in the Sikorsky S-70 Black Hawk helicopter.

Referring now primarily to FIG. 3 of the drawing, there is illustrated the rear, or aft, trunnion 18 provided with transverse bolt openings 34 for reception of the attaching bolts 22. Also shown is an axial bore 36 in the aft end of the trunnion. It is in this axial bore that the strain gauge components of the weighing scale of this invention are contained. In well known manner, the strain gauge components are bonded securely to the surface of the axial bore by epoxy or other suitable bonding agent which insures against displacement of the strain gauges relative to the bore surface.

In the embodiment illustrated, strain gauge 38 is bonded to one side of the axial bore in a preselected position for measuring tensile shear strain in the trunnion as a result of a load being applied to the cargo hook. A companion strain gauge 40 is bonded to the bore surface diametrically opposite strain gauge 38 and, like the latter, is positioned for measuring tensile shear strain in the trunnion.

Strain gauges 42 and 44 are bonded to the bore surface adjacent the strain gauges 38 and 40, respectively, and are configured and arranged to measure compressive shear strain in the trunnion due to the load carried by the cargo hook.

It is to be noted that the cargo hook illustrated utilizes the forward trunnion 14 as a passageway for electrical conductors associated with the emergency release mechanism for the cargo hook arm, through the use of an explosive device. The weighing scale of this invention therefore is associated only with the aft trunnion 18. Accordingly, the electrical signals provided by the strain gauges as a consequence of a load being supported by the cargo hook, although directly proportional to the load, correspond substantially to only one-half of the weight of the load. The precise location of the strain gauges in the trunnion is determined empirically, as explained hereinafter, and by computer analysis so that the visible readout on a weight indicator is an accurate representation of the weight of the load.

It is also to be noted that the cargo hook illustrated is mounted in a helicopter that conventionally seldom flies level, but rather a few degrees nose up, for example up to about 5°. Since only the aft trunnion is sensing the weight of a load on the cargo hook, a gross error in the displayed weight would be seen without further compensation. Compensation for this angular displacement from horizontal is provided by axial force strain gauges 46, 48, 50 and 52. Strain gauges 46 and 48 are secured to diametrically opposite positions in the axial bore surface adjacent the previously disclosed strain gauges 42 and 44 and are configured for measuring compression strains of the trunnion due to axial forces applied thereto by loads supported from the cargo hook with the helicopter in a nose-up attitude. Strain gauges 50 and 52 overlap the strain gauges 46 and 48, respectively, and are configured to measure Poisson strain forces induced by the aforementioned axial force.

Exemplary of strain gauges usable in the illustrated embodiment are those manufactured by Micromeasurements Division of Vishay. Model No. TA-06-062TA-350 is usable for strain gauges 38, 40, 42 and 44, while Model No. CEA-06-062WT-350 is usable for strain gauges 46, 48, 50 and 52. The precise positioning of strain gauges 46, 48, 50 and 52 is achieved empirically by comparing load weight readings on indicator 54 (FIG. 6) with load weights applied to the cargo hook as the position of the strain gauge is varied.

Figure 6:
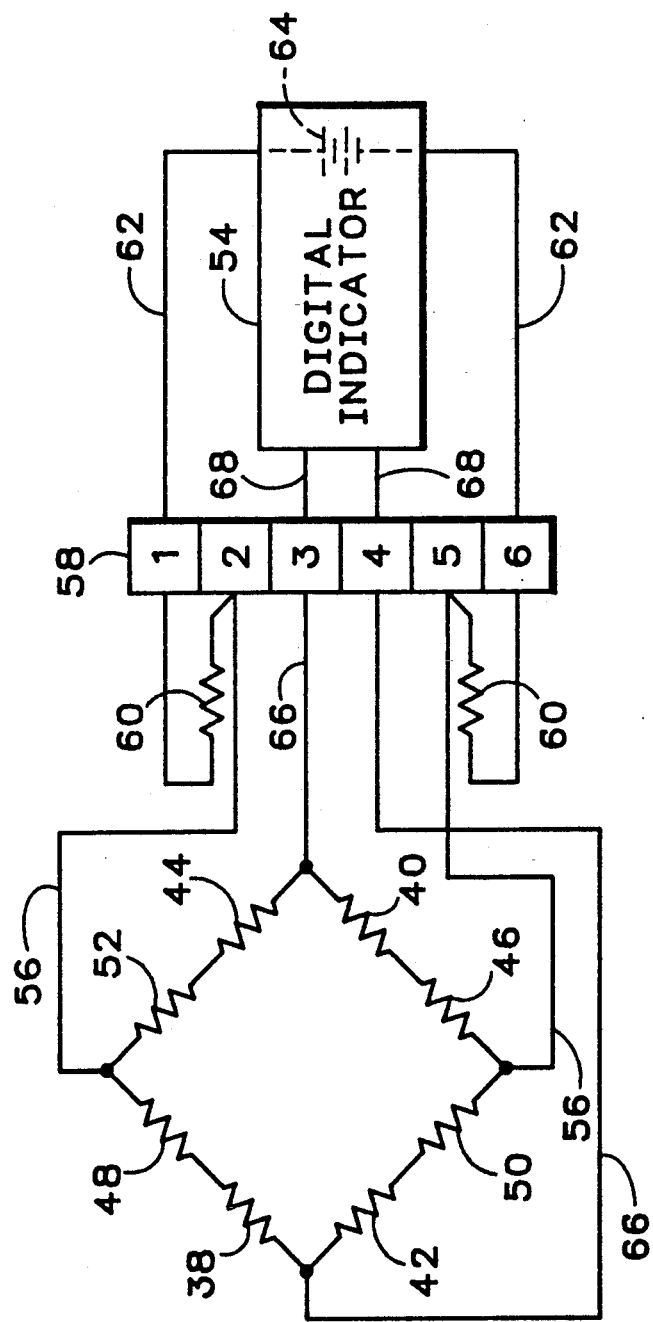
FIG. 6 is a schematic diagram of an electric circuit for the weighing scale component of the cargo hook assembly, showing a Wheatstone bridge arrangement of the strain gauges.

Referring to FIG. 6 of the drawings, the strain gauges are connected together in the configuration of a Wheatstone bridge, with each of the shear strain gauges 38, 40, 42, and 44 being connected in series with an associated axial force strain gauge 50, 46, 48 and 52, respectively. In this manner, each of the strain gauges which functions to measure load weight is compensated for angular disposition of the fore and aft axis of the helicopter relative to horizontal.

As alternate methods, strain gauges 38, 40, 42 and 44 may be connected together as a separate Wheatstone bridge and strain gauges 46, 48, 50 and 52 may also be connected together as a separate Wheatstone bridge. Both Wheatstone bridges then are connected electrically in parallel, or each may be electronically summed algebraically by additional electronic components.

As illustrated, electrical conductors 56 extend from connections on the Wheatstone bridge to terminals numbered 2 and 5 on the terminal block 58. Temperature compensating resistors 60 interconnect the same terminals numbered 2 and 5 and adjacent terminals numbered 1 and 6, from which conductors 62 lead to the terminals of a source 64 of direct current power which is housed and regulated within the enclosure of the digital indicator 54.

Conductors 66 connect the output points on the Wheatstone bridge to terminals identified as numbers 3 and 4 on the terminal block 58. To these terminals are connected the conductors 68 which lead to the input terminals of indicator 54 which provides a direct readout of the weight of a load carried by the cargo hook. As previously mentioned, since the strain gauges are associated with only the aft trunion, the indicator is adjusted to provide a readout of true weight of the load in response to electric signals provided by the strain gauges.

The electrical conductors 62 and 68 are extended from the terminal block 58 outwardly of the aft trunnion and into the helicopter for connection to the appropriately positioned indicator 54. This is achieved in the embodiment illustrated in a manner which protects against the deleterious effects of environmental contaminants, such as dust and moisture. Thus, referring to FIG. 3 of the drawings, the conductors are extended outwardly from the terminal block 58 through an axial counterbore 70 and passageway 72, thence through the transverse opening 74 which is provided simply to reduce the weight of the trunnion, thence through the outfeed passageway 76 and into the infeed passageway 78 of a connector block 80. The connector block is secured to the trunnion by such means as self-locking securing pins 82 (FIG. 2). A conductive O-ring ring seal 84 is interposed between the connector block and the trunnion, around the infeed passageway 78, to insure against dust and moisture entering the passageways, and to provide an electrically conductive seal to eliminate electromagnetic interference.

A threaded outfeed passageway 86 connects a conductor coupler 88 by which the conductors 62 and 68 are extended in cable 90 for connection to the indicator 54.

Potting material 92 is injected to fill the counterbore 70, passageway 72, transverse opening 74, outfeed passageway 76 and infeed passageway 78, to insure against environmental moisture.

Figure 4:
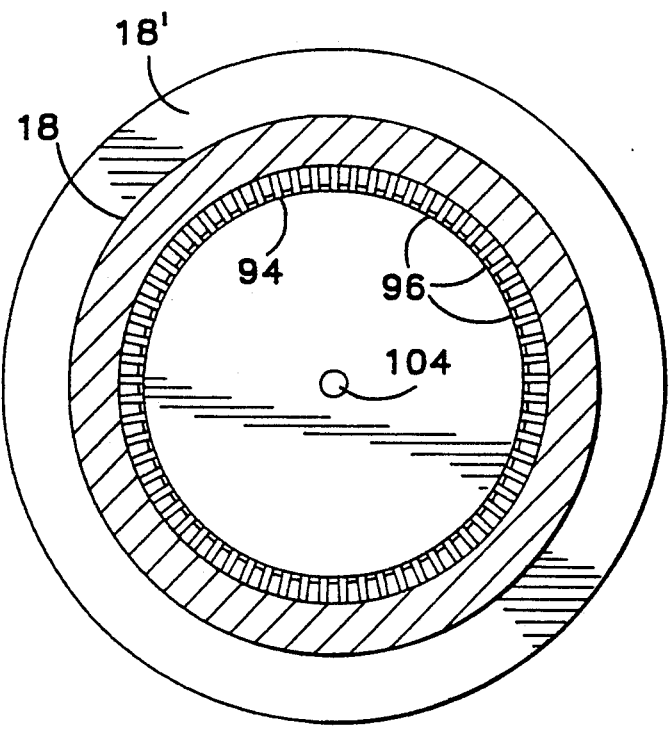
FIG. 4 is a transverse sectional view taken on the line 4—4 in FIG. 3.
Figure 5:
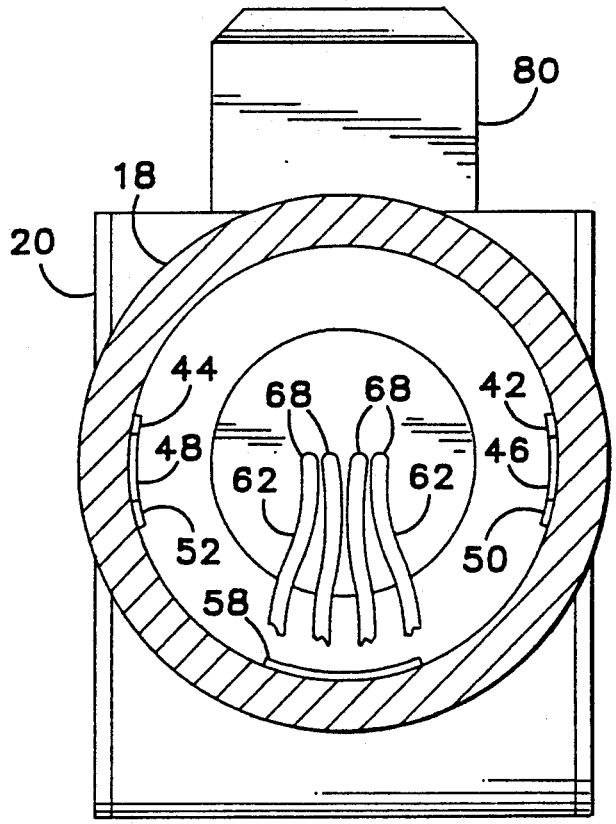
FIG. 5 is a transverse sectional view taken on the line 5—5 in FIG. 3.

Referring to FIG. 4, protection against electromagnetic interference also is provided by a copper shielding strip shaped as an annular ring 94. The strip is formed with a multiplicity of spaced apart fingers 96. The fingers are resilient and, when the strip is made annular, the fingers make resilient contact with the trunnion bore surface. This positive contact of the fingers with the surface of the trunnion bore 36 insures a low RF impedence contact all the way around, whereby to protect against electromagnetic interference. A metal plug 98 is secured to the ring and is retained in position by a press fit of the shoulder 98' of the plug with the surface of the trunnion bore. The plug is sealed to the surface of the trunnion bore 36 by an epoxy or other suitable sealant material 100.

A threaded opening 102 axially through the plug 98 removably receives a closure screw 104 The threaded opening serves to communicate the trunnion bore 36 first with a source of vacuum to evacuate the air space within the trunnion bore, and then to communicate a source of dry nitrogen which is filled into the space of the bore. The opening 102 is exposed for this purpose by initially omitting the sealant material 100 from the area of the opening. The closure screw 104 then is installed to close the space now filled with dry nitrogen. An epoxy or other suitable sealing material 100' then is filled into the area of the screw head. The sealant materials 100 and 100' provide an environmentally tight seal which prevents the entrance of dust or moisture into the trunnion bore.

It is to be noted that the aft trunnion 18 and weighing scale assembly may be removed from the cargo hook housing, with speed and facility, merely by removing the three bolts 22 and bearing cap 16'. It is the provision of the electrical connector block 80 that facilitates this removal without further disassembly of the cargo hook. The weighing scale components then may be serviced and the assembly thereafter re-installed with equal speed and facility.

It will be apparent to those skilled in the art that various modifications and changes may be made in the structural details described hereinbefore. For example, in an installation in which both fore and aft trunnions are available for use, both trunnions may be fitted with the shear strain gauges 38, 40, 42, and 44. The compensating strain gauges 46, 48, 50 and 52 may be omitted in such an arrangement. The foregoing and other modifications and changes may be made, as desired, without departing from the spirit of this invention and the scope of the appended claims.

We claim:

1. In combination with a cargo hook having fore and aft trunnions for mounting in fore and aft bearings supported by a frame a weighing scale comprising:
   a) a pair of shear strain gauges mounted on one of the trunnions for measuring tensile shear strain in said one of the trunnions resulting from a load applied to the cargo hook,
   b) a pair of shear strain gauges mounted on said one trunnions for measuring compressive shear strain in said one of the trunnions resulting from a load applied to the cargo hook,
   c) an electric circuit including said strain gauges for producing electric signals proportional to loads applied to said cargo hook, and
   d) indicator means connected in said electric circuit and arranged to convert said electric signals to corresponding units of load weight.

2. The combination of claim 1 wherein said one trunnions has a bore therein and said strain gauges are secured to the surface of said bore.

3. The combination of claim 2 including a low RF impedence means in the bore to protect against electromagnetic interference.

4. The combination of claim 3 wherein the low RF impedence means comprises a copper ring provided with circumferentially spaced resilient fingers engaging the bore surface.

5. The combination of claim 2 including passageway means in said one of said trunnions communicating at one end with said bore and at an opposite end with an outer surface of said one of said trunnions, for passing electrical conductors from the strain gauges in said bore outwardly of said one of said trunnions for connection to electric circuit components external of said said one of said trunnions.

6. The combination of claim 5 including a connector block secured to said one of said trunnions and having passageway means therein registering at one end with the said opposite end of the passageway means in said one of said trunnions and at the opposite end with an outer surface of the block, for passing said electrical conductors therethrough.

7. The combination of claim 6 including sealing means filling said passageway means in said one of said trunnions and block for protecting the strain gauges against environmental contaminants.

8. The combination of claim 6 including an electrically conductive O-ring seal between the connector block and of said trunnions surrounding said passageway means and providing an air and moisture tight seal and an electromagnetic interference barrier.

9. The combination of claim 1 including a pair of axial force strain gauges mounted on said one of said trunnions adjacent each of said pairs of shear strain gauges in position for measuring compressive axial forces in said of said trunnions resulting from a load applied to the cargo hook when an axis through the fore and aft trunnions is displaced from horizontal, said axial force strain gauges being included in said electric circuit to compensate for an angular deviation from horizontal of the axis through said fore and aft trunnions.

10. The combination of claim 2 including a pair of Poisson force strain gauges mounted in the opening in said one of said trunnions adjacent each of said pairs of shear strain gauges in position for measuring Poisson forces in said of said trunnions resulting from a load applied to the cargo hook when the axis through the fore and aft trunnions is displaced from horizontal, said Poisson force strain gauges being included in said electric circuit to compensate for the angular deviation from horizontal of the axis through said fore and aft trunnions.

11. In combination with a cargo hook having fore and aft trunnions for mounting in fore and aft bearings supported by a frame, a weighing scale comprising:
   a) electric weight sensing means secured to a surface of one of said trunnions for sensing strain in the one of said trunnions resulting from a load applied to the cargo hook,
   b) an electric circuit including said electric weight sensing means for producing electric signals proportional to loads applied to said cargo hook, and
   c) indicator means connected to said electric circuit and arranged to convert said electric signals to corresponding units of load weight.

12. The combination of claim 11 wherein said one of said trunnions has an internal bore and the electric weight sensing means is secured to an inner surface of said bore.

* * * * *

UNITED STATES PATENT AND TRADEMARK OFFICE
CERTIFICATE OF CORRECTION

PATENT NO. : 5,264,666
DATED : 23 November 1993
INVENTOR(S) : David C. English, David H. Fish, Ronald A. Wenzel It is certified that error appears in the above-identified patent and that said Letters Patent is hereby corrected as shown below:

Column 4, line 64, after "104" insert a period (.).

" 6, line 19, after "and" insert: --said one--.

Signed and Sealed this

Tenth Day of May, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,264,666
DATED : November 23, 1993
INVENTOR(S) : David C. English, et al It is certified that error appears in the above-indentified patent and that said Letters Patent is hereby corrected as shown below:

Column 5, line 38, after "one" insert: --of said--.

Signed and Sealed this

Thirty-first Day of May, 1994

Attest:

BRUCE LEHMAN

*Attesting Officer*      *Commissioner of Patents and Trademarks*